(12) United States Patent
Zhao

(10) Patent No.: US 9,067,484 B2
(45) Date of Patent: Jun. 30, 2015

(54) ELECTRIC VEHICLE CONTROL SYSTEMS

(71) Applicant: Dezhou David Zhao, Windsor (CA)

(72) Inventor: Dezhou David Zhao, Windsor (CA)

(*) Notice: Subject to any disclaimer, the term of this patent is extended or adjusted under 35 U.S.C. 154(b) by 35 days.

(21) Appl. No.: 14/061,016

(22) Filed: Oct. 23, 2013

(65) Prior Publication Data
US 2015/0107914 A1 Apr. 23, 2015

(51) Int. Cl.
*B60K 16/00* (2006.01)
*B60K 1/02* (2006.01)
*B60K 6/26* (2007.10)
*B60L 11/18* (2006.01)
*B60R 25/30* (2013.01)
*B60L 15/20* (2006.01)

(52) U.S. Cl.
CPC ... *B60K 1/02* (2013.01); *B60K 6/26* (2013.01); *B60L 11/1861* (2013.01); *B60K 16/00* (2013.01); *B60R 25/30* (2013.01); *B60L 15/20* (2013.01); *B60K 2016/003* (2013.10); *B60K 2016/006* (2013.01); *Y10S 903/906* (2013.01)

(58) Field of Classification Search
CPC ........................................................ Y02T 10/90
USPC ............................................. 180/54.1–65.51
See application file for complete search history.

(56) References Cited

U.S. PATENT DOCUMENTS

| 5,461,298 | A  | * | 10/1995 | Lara et al. ...................... 320/109 |
| 5,982,139 | A  | * | 11/1999 | Parise ............................ 320/109 |
| 6,295,487 | B1 |   | 9/2001  | Ono et al. |
| 6,991,051 | B2 | * | 1/2006  | Swindell et al. ............. 180/65.1 |
| 7,135,786 | B1 | * | 11/2006 | Deets .............................. 290/55 |
| 2001/0039230 | A1 | | 11/2001 | Severinsky et al. |
| 2004/0084234 | A1 | | 5/2004  | Yatabe et al. |
| 2004/0119289 | A1 | | 6/2004  | Zabramny |
| 2004/0124023 | A1 | | 7/2004  | Plishner |
| 2004/0234109 | A1 | | 11/2004 | Lemelson et al. |
| 2005/0247503 | A1 | | 11/2005 | Imazu |
| 2007/0050097 | A1 | | 3/2007  | Lo |
| 2007/0117669 | A1 | | 5/2007  | Garnett et al. |
| 2007/0288131 | A1 | | 12/2007 | Yakes et al. |
| 2011/0048827 | A1 | | 3/2011  | Chemey et al. |
| 2012/0019172 | A1 | | 1/2012  | Zing et al. |
| 2013/0149093 | A1 | | 6/2013  | Kaneko et al. |
| 2013/0244063 | A1 | | 9/2013  | Dhar et al. |

FOREIGN PATENT DOCUMENTS

EP 2634077 A1 9/2013

* cited by examiner

*Primary Examiner* — John Walters
*Assistant Examiner* — James Triggs

(57) ABSTRACT

An electric vehicle may include a first drive axle to drive a first wheel of the electric vehicle, a first electric motor mounted directly on the first drive axle, a power supply such as a battery to power the first electric motor, and a controller to control the electric motor. The electric vehicle may include a second drive axle to drive a second wheel and a second electric motor mounted on the second drive axle. The electric motor may be only mounted on the first drive axle. The battery may be formed from an array of batteries.

17 Claims, 21 Drawing Sheets

FIG. 11 A                    FIG. 11 B (Battery inside & under the seat or /and hood of the vehicle)

(Battery outside of the vehicle body. For example, attach to the bottom.)

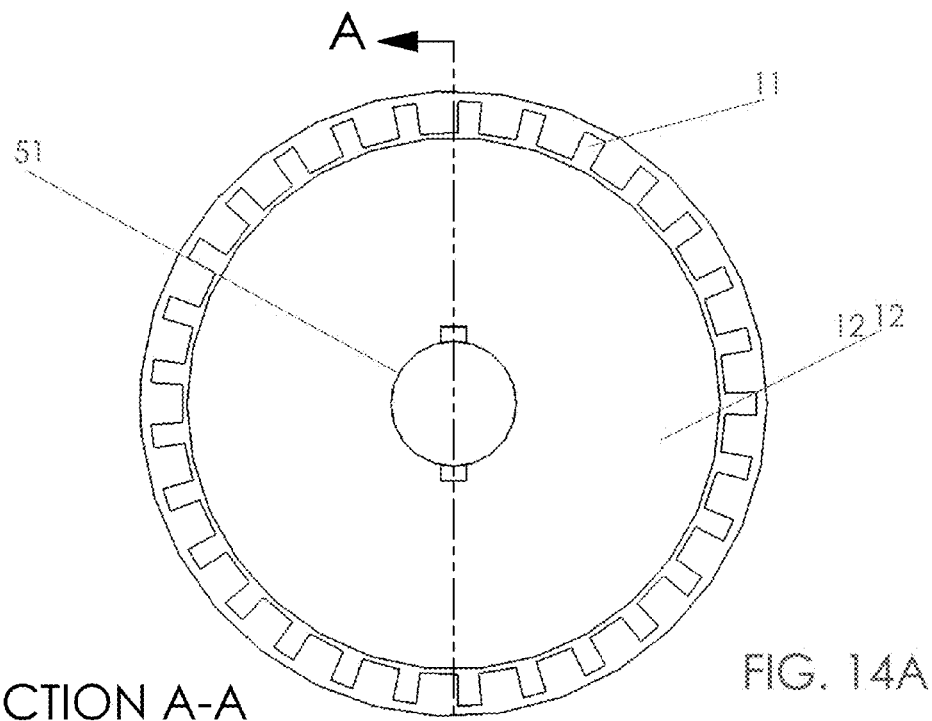
FIG. 14A
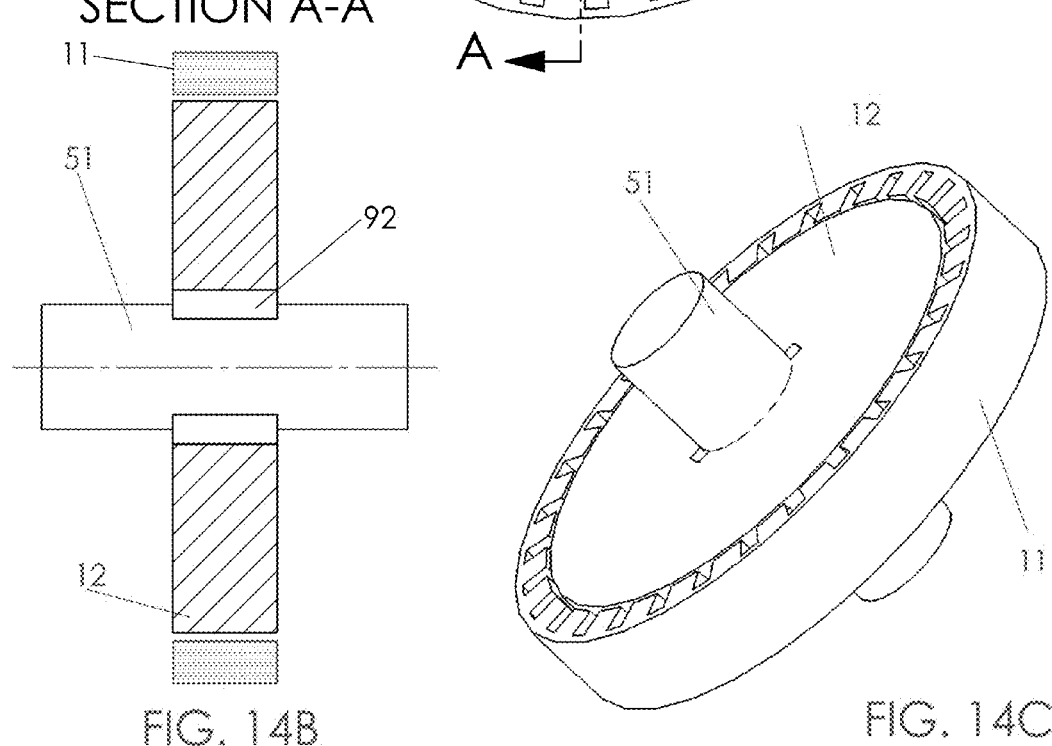
SECTION A-A
FIG. 14B
FIG. 14C

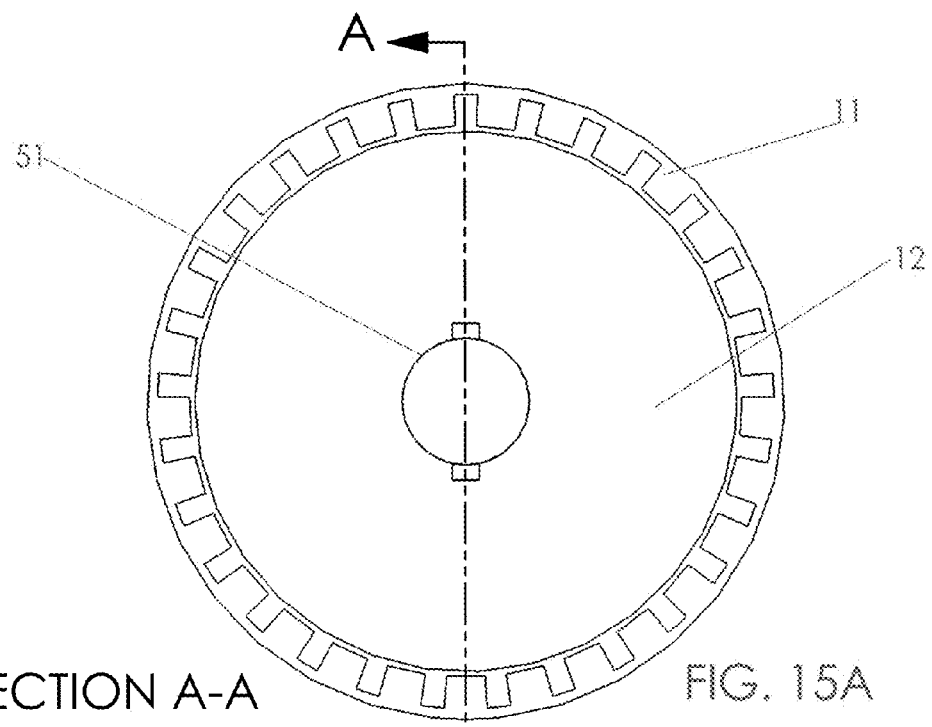
FIG. 15A
SECTION A-A
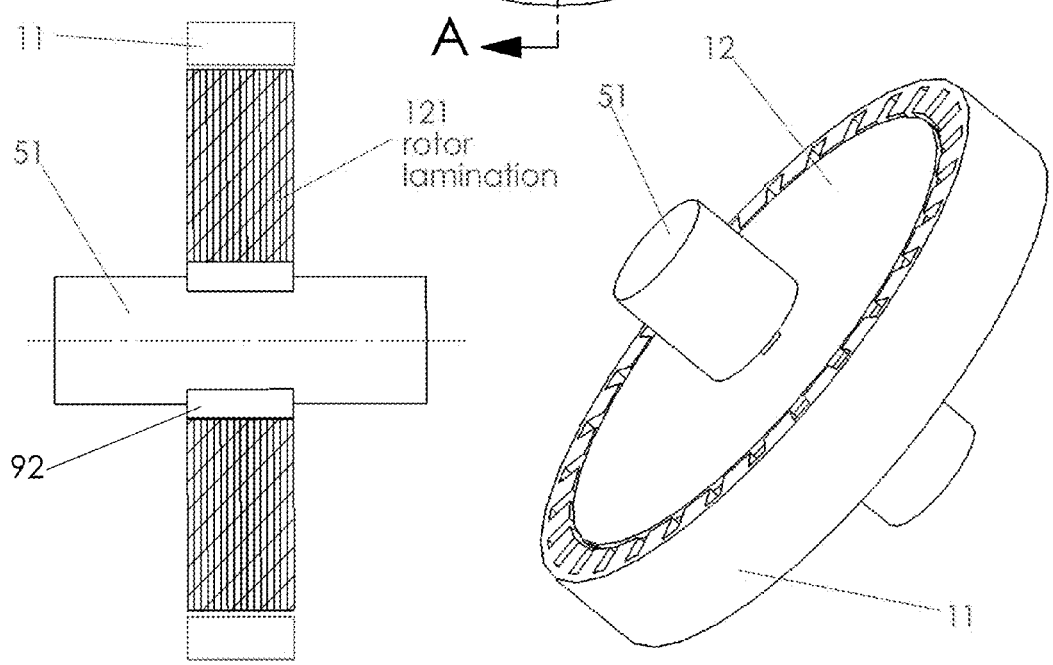
FIG. 15B
FIG. 15C

SECTION A-A

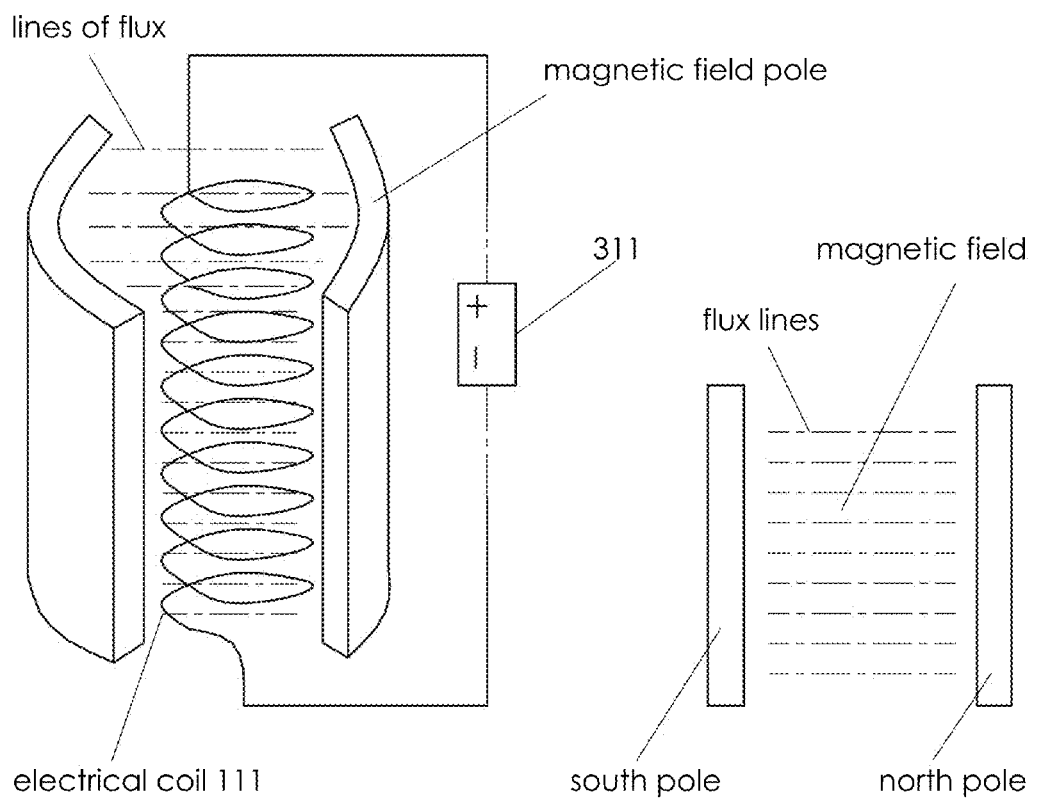
FIG. 20 A
FIG. 20 B
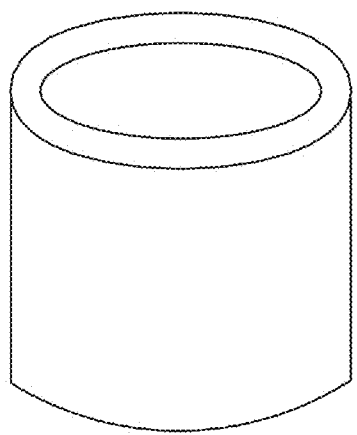
FIG. 20 C
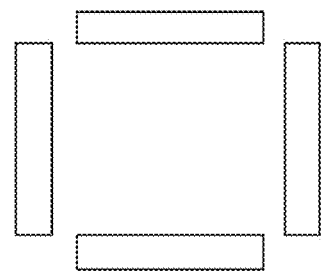
FIG. 20 D

ELECTRIC VEHICLE CONTROL SYSTEMS

FIELD OF THE INVENTION

The present invention relates to vehicles and more particularly to electric vehicles.

BACKGROUND

As the price of oil rises, the price of gasoline, diesel and other fuels, and the price to operate traditional vehicles increase. Furthermore, the traditional vehicles which operate based upon gasoline and other fuels, have undesirable environmental consequences. Electrical vehicles provide a valuable alternative to the traditional vehicle.

SUMMARY

An electric vehicle may include a first drive axle to drive a first wheel of the electric vehicle, a first electric motor mounted directly on the first drive axle, a power supply such as a battery to power the first electric motor, and a controller to control the electric motor.

The electric vehicle may include a second drive axle to drive a second wheel and a second electric motor mounted on the second drive axle.

The electric motor may be only mounted on the first drive axle.

The electric vehicle may include multiple driving axles to drive the vehicle and electrical motors mounted on those additional driving axles.

The electric vehicle may be a pure battery powered electrical vehicle; or a hybrid type electrical vehicle combined with fuel type generator/alternator and battery; or a pure fuel type electrical vehicle without engine and transmission box inside.

The electric vehicle may convert vehicle vertical vibration mechanical energy into electricity.

The electric vehicle may be a remote control to drive the vehicle rather than human being inside to drive the vehicle.

The electrical motor may be a disk type electrical motor, or a non-disk type electrical motor, or a combination of disk type electrical motor and non-disk type electrical motor.

The battery may be formed from an array of batteries.

The battery may be interior to the electric vehicle.

The battery may be exterior to the electric vehicle.

BRIEF DESCRIPTION OF THE DRAWINGS

The invention may be understood by reference to the following description taken in conjunction with the accompanying drawings, in which, like reference numerals identify like elements, and in which:

FIG. 14A illustrates a cross-sectional view of the rotor and stator of the present invention;

FIG. 14B illustrates a sectional view of the rotor and stator of the present invention;

FIG. 14C illustrates a perspective view of the rotor and stator of the present invention;

FIG. 15A illustrates a cross-sectional view of the stator and rotor of the electric motor of the present invention;

FIG. 15B illustrates a side cross-sectional view of the stator and rotor of the electric motor of the present invention;

FIG. 15C illustrates a perspective view of the stator and rotor of the electric motor of the present invention;

FIG. 20 A illustrates a way to convert the vehicle vertical vibration mechanical energy into electrical energy and charge into battery by creating a magnetic field.

FIG. 20B illustrates a magnetic field.

FIG. 20C and FIG. 20D illustrate another shape of magnetic field.

DESCRIPTION

Figure 1:
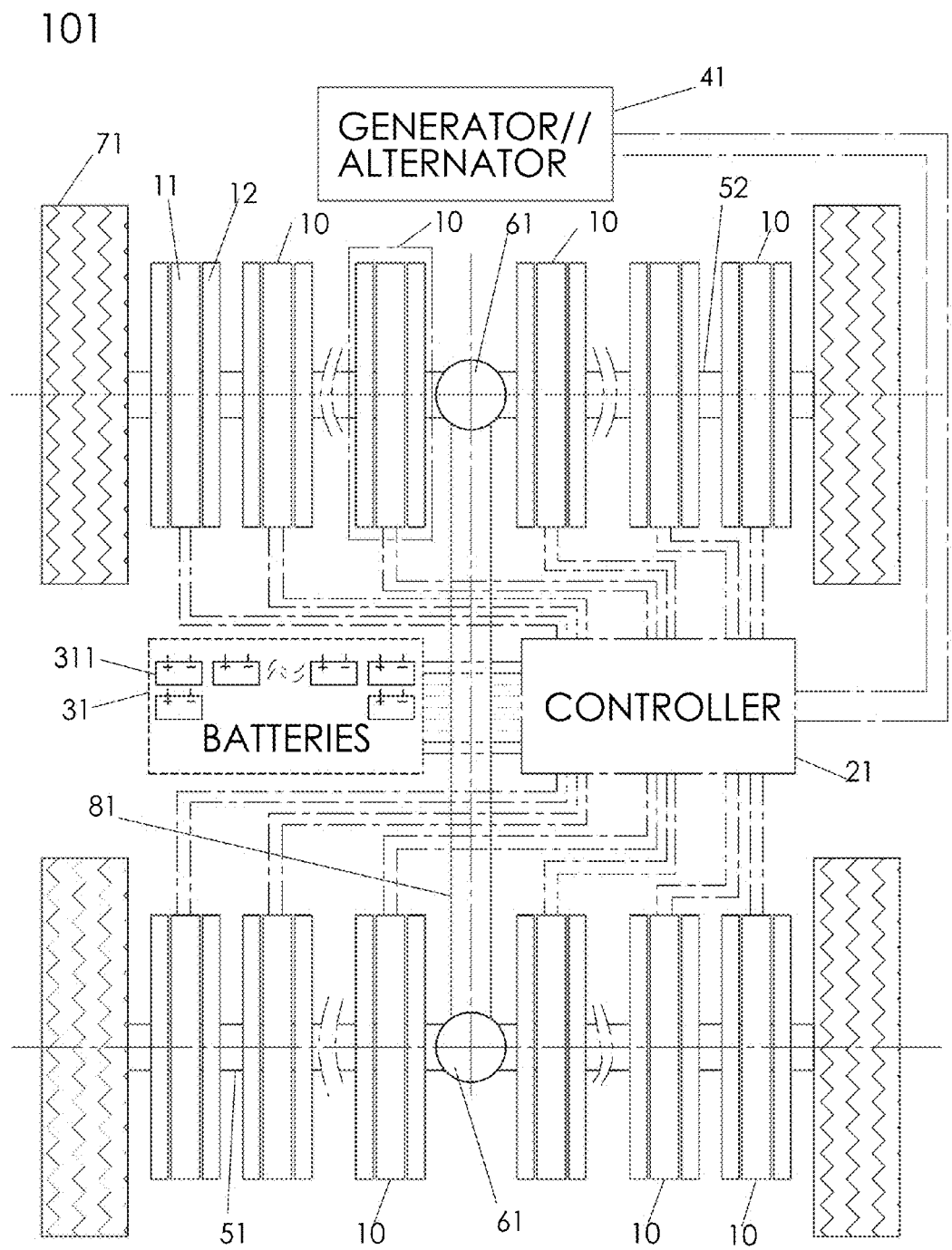
FIG. 1 illustrates a schematic drawing of the electric vehicle of the present invention.

FIG. 1 illustrates a schematic drawing for the electric vehicle 101 which may include a first driving axle 51 which may be connected to first wheels 71 and which may extend directly through a multitude of first electric motors 10. The electric motors 10 may be powered by an array of batteries 31 which may include a multitude of batteries 331 to supply electric power to the electric motors 10. The electric motors 10 may be controlled by a controller 21, and the driving axle 51 may be connected to a universal joint 61 which may be connected to a universal axle 81.

FIG. 1 additionally illustrates a second driving axle 52 which may be connected to the second wheels 71 and may be directly connected to a second electric motors 10.

Figure 2:
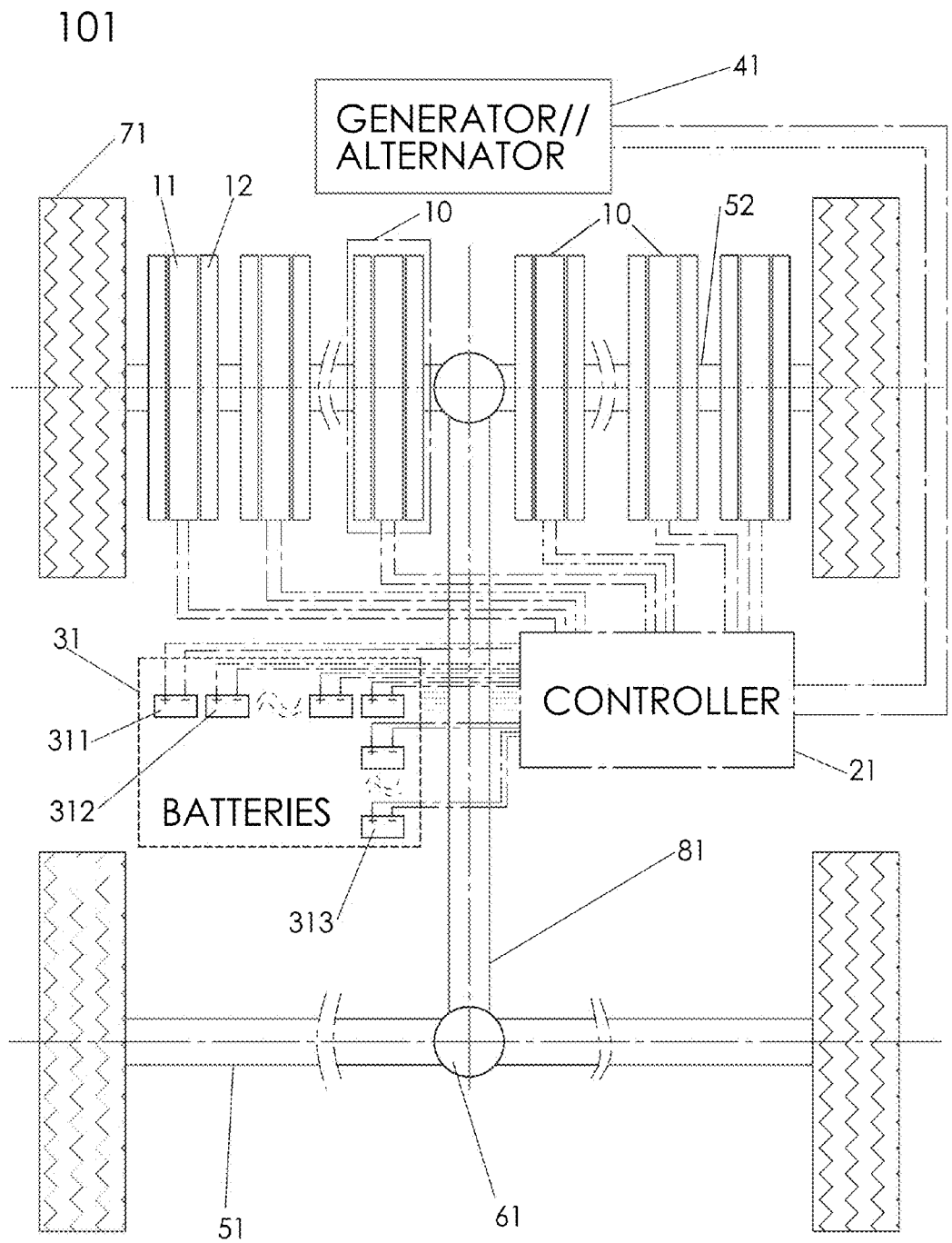
FIG. 2 illustrates a another schematic drawing of the electric vehicle of the present invention.

FIG. 2 illustrates a schematic drawing for the electric vehicle 101 and illustrates the electric motors 10 positioned only along a single driving axle 51 or axle 52. The present invention relates to an electric/smart vehicle 101 which may include a drive system 103 which may include a single or/and multiple electrical motors 10 which may be a Disk Type Motor (or called Flux, Axial Flux Motor or Pancake Motor) (see FIG. 5A, FIG. 5B, FIG. 5C, FIG. 5D, FIG. 8A, FIG. 8B and FIG. 9) or maybe a non-disk type motor (see FIG. 14A, FIG. 14B, FIG. 14C and FIG. 15A, FIG. 15B, FIG. 15C), or may be a combination of the Disk type and non-disk type motors (see FIG. 16A, FIG. 16B, FIG. 16C). These electric motors 10 for example the combination of disk type and non-disc may be mounted on the same driving axle 51, or/and 52. (see FIG. 1 and FIG. 2). The electrical smart vehicle 101 has much higher energy usage efficiency than traditional vehicles.

Figure 19:
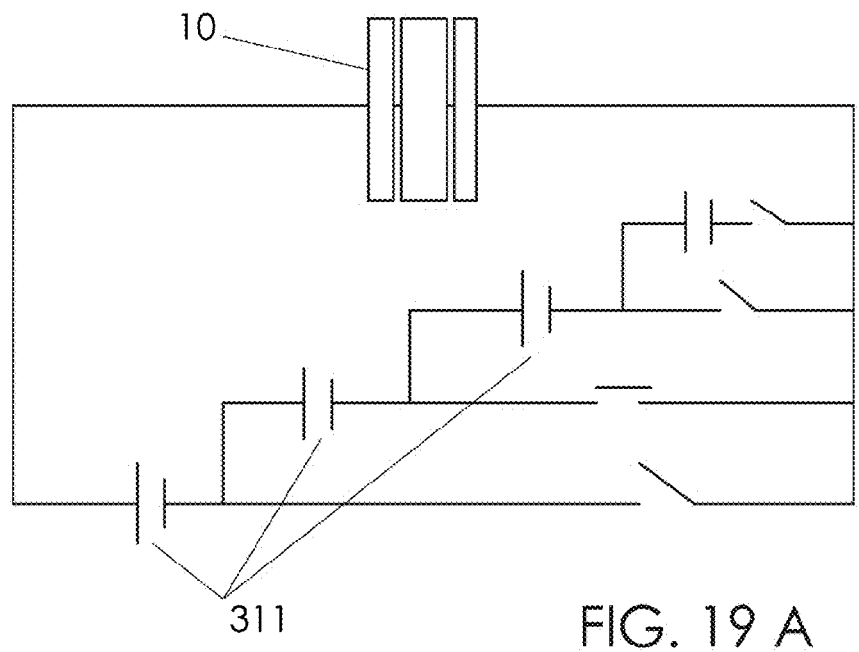
FIG. 19A illustrates a way to provide higher driving force by connecting additional batteries.
FIG. 19B illustrates a way to change the current inside the electrical motor, which may change the electrical motor turning force by change the resistance in the circuit.
Figure 19:
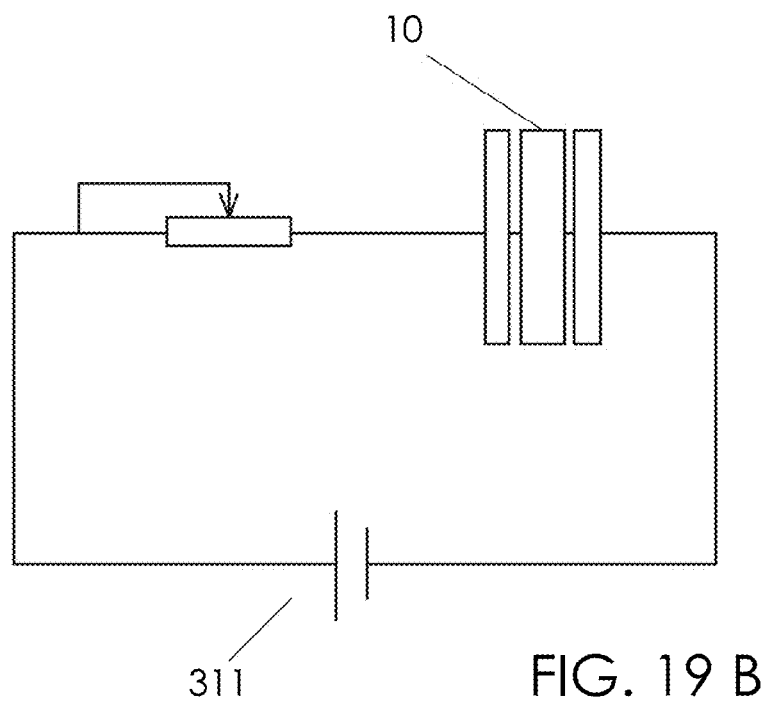

Each electrical motor 10 may be connected to a single battery 311 separately or/and battery unit 31 which may include an array of batteries 311 which may be connected in series (if need to increase the torque of the motor 10 (see FIG. 19A)). The number of electrical motors 10 which may be needed to be energized by the power supply for example such as the number of batteries 311 in a vehicle 101 may depend on the driving requirements such as the maximum driving speed, driven force/torque, weights and loads, driving resistance, wind resistance, etc. of the vehicle. The electric vehicle 101 may include a motor controller 21 to control the number and type of electrical motors 10 which may be need to be connected with electrical power such as battery 311 or batteries 311 from the battery unit 31 in order to produce enough torque/turning force to drive the electric vehicle 101 and for example to control the frequency that the coil 111, 112, etc. may be energized with electrical power from the battery 311 which relates to the electrical motor turning speed in order to reach the driven force and the vehicle driven speed The controller 21 controls the frequency that the electric motor coils 111, 112, etc. is energized with electrical power which may be supplied from such as battery 311, and/or the generator/alternator 41 which may generate electrical power by the movement of the electric vehicle 101 or by normal fuel, and/or another power supply and to control the turning speed of the electric motor 10 to drive the vehicle. The controller 21 may control all electric motor coils 111, 112 of the electric motor 10 to distribute the same frequency of electrical power in order to control all of the electric motors 10 to have the same turning speed in order to drive the electric vehicle 101 smoothly.

The electrical motor 10 may also connect to a fuel generator/(or called alternator) 41 in the vehicle to become a kind of hybrid vehicle in order to have a longer driven distance in case the battery 331 is out of electrical power (dead).

The battery 311 may be a traditional battery including a lithium battery, or other batteries and may be charged by normal utility power supply, or by a solar or/and winded power charger that mounted on the vehicle, as disclosed for example, in U.S. Pat. No. 6,991,051 B2 and U.S. Pat. No. 7,135,786 B1, or by the heat inside the vehicle which be converted to electricity (during the summer time), or by a wireless remote charging system, as disclosed for example, in U.S. Pat. No. 5,982,139 and U.S. Pat. No. 5,461,298.

If the vehicle needs more than four electrical motors 10, the electrical motor 10 may be positioned in the front (first) driven axle 51 and back (second) driven axle 52 in order to provide a four-wheel drive (see FIG. 1).

Of course, if there is sufficient space on the driven axle 51/52, all the electric motors 10 may be positioned only in the front axle 51 or only in the back axle 52 to have a front drive or back drive type of vehicle. (see FIG. 2)

Figure 3A:
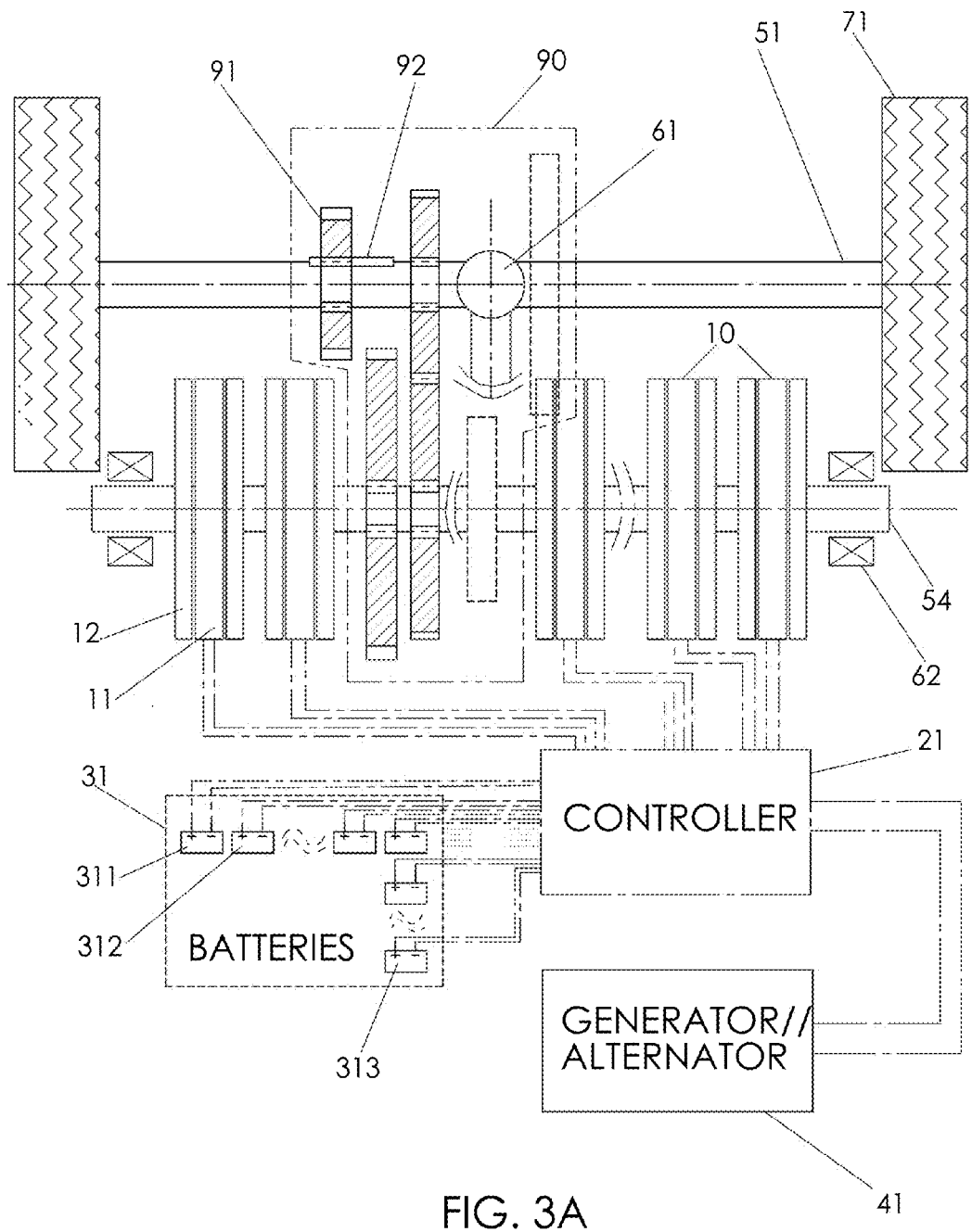
FIG. 3A illustrates another schematic drawing of the electric vehicle of the present invention.

FIG. 3A illustrates a schematic of an electric vehicle 101 which may have been insufficient clearance with the road surface for the electric motor 10 to be directly mounted on the driving axle 51. Since there is a clearance requirement at the bottom of vehicle, if the wheel 71 size is not large enough with respect to the electric motor 10 and/or if the bottom of electric motor 10 may be too close to the ground when the axle 51/52 are mounted with electrical motors 10, the axle 51/52 may be raised to a higher position in the vehicle and employ other normal traditional techniques such as gear transmission/driving system 90 to drive the axle 54 that mounted the wheels 71 in order to have a sufficient clearance. The transmission 90 may include a gear 91 and key 92 transfer the power from the electric motor 10 to the driving axle 51. (see FIG. 3A).

Figure 3B:
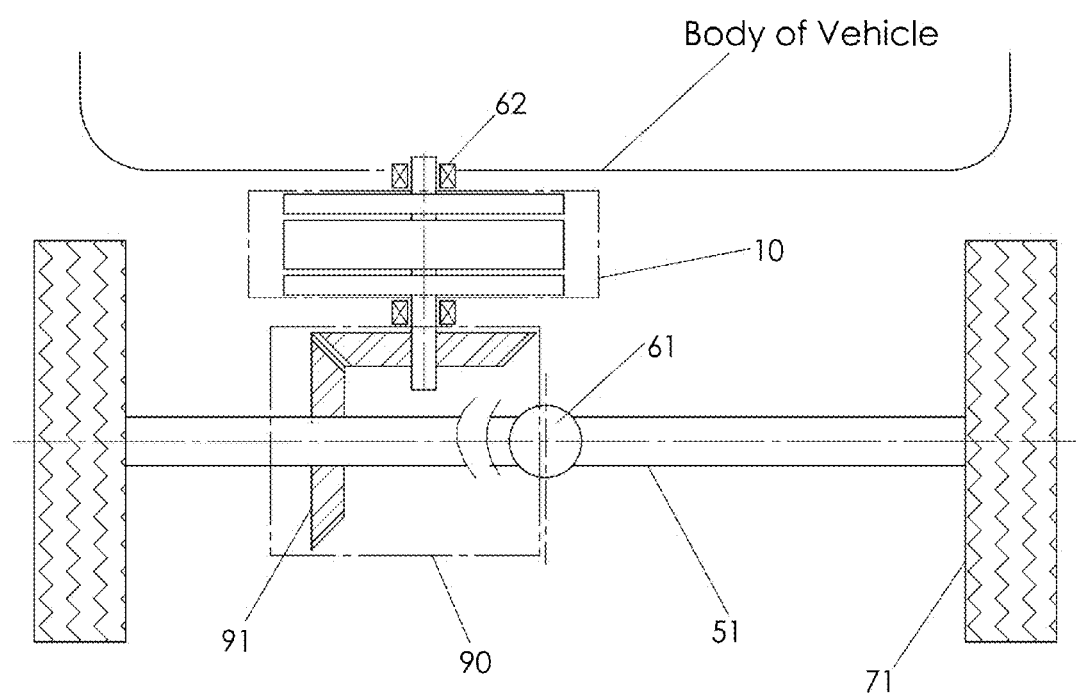
FIG. 3B illustrates another schematic drawing of the electric vehicle of the present invention.

FIG. 3B illustrates another schematic of an electric vehicle 101 which the electrical motor 10 may be mounted to let the electrical motor 10 turning direction parallel to the bottom of the vehicle or road surface, then traditional transmission method such as gear may be needed to convert the electrical motor turning direction to perpendicular to the bottom of the vehicle or road surface showing in FIG. 1, FIG. 2, FIG. 3A and FIG. 4.

Figure 4:
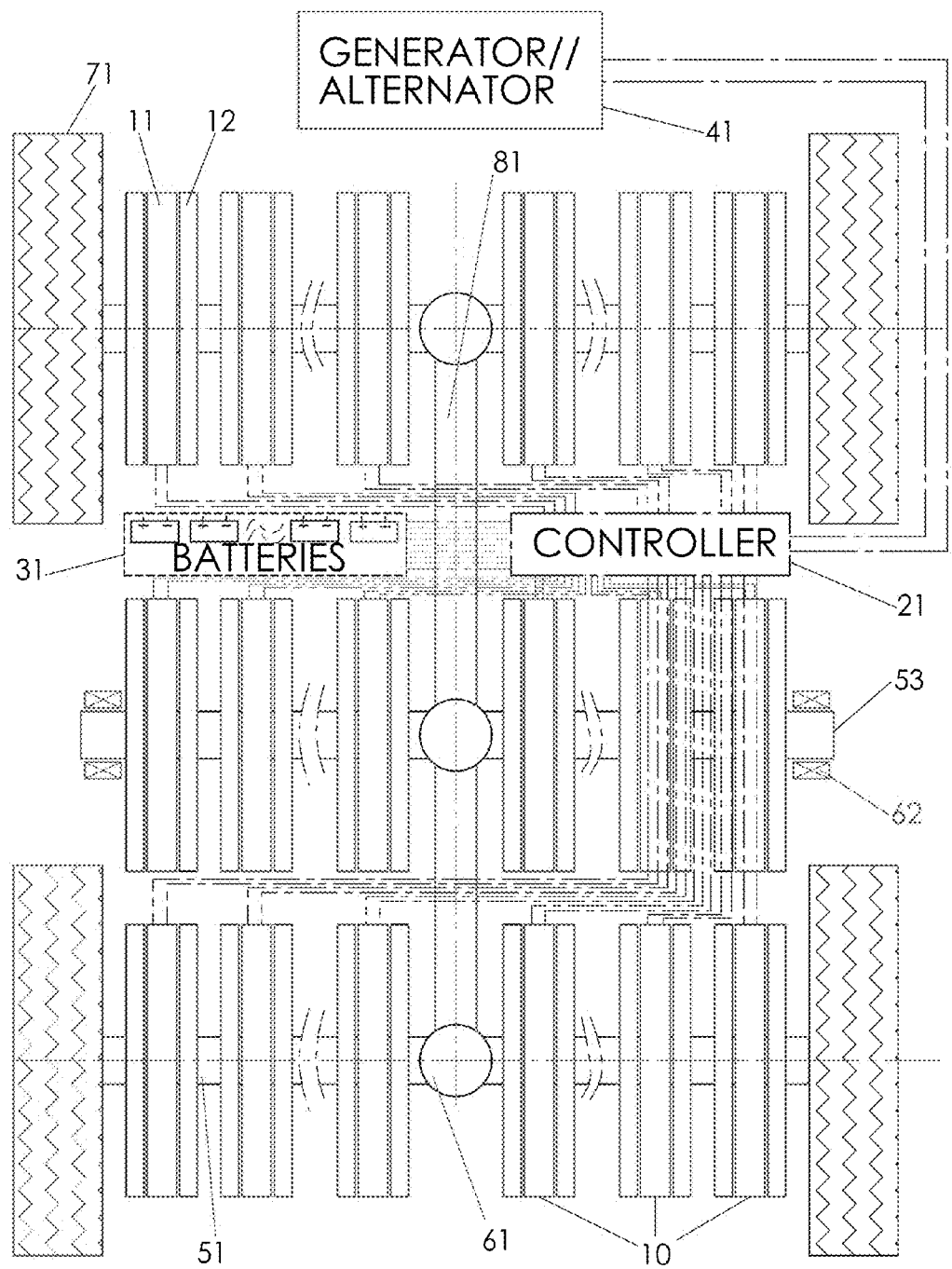
FIG. 4 illustrates another schematic drawing of the electric vehicle of the present invention.
Figure 13:
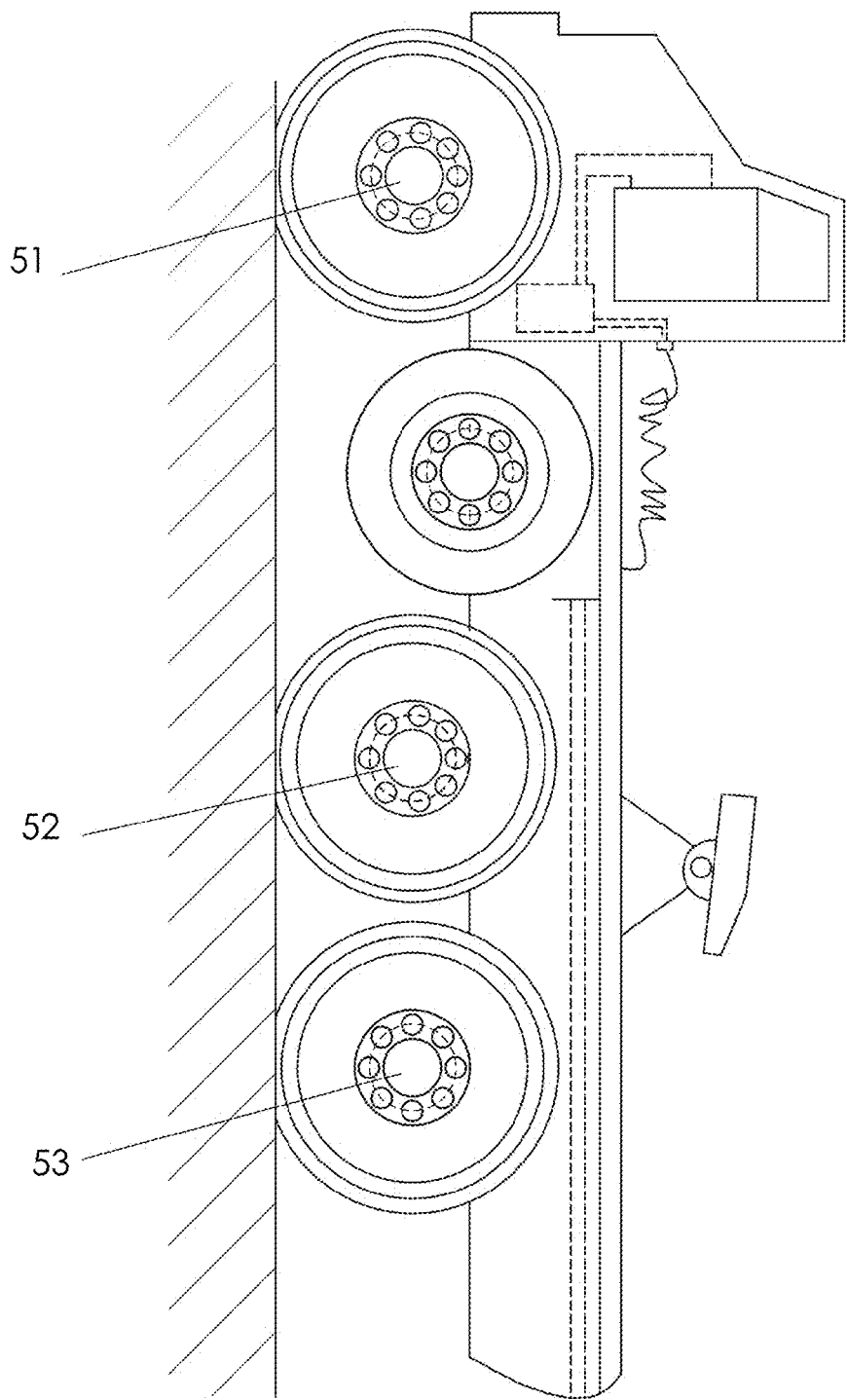
FIG. 13 illustrates a side view of the vehicle of the present invention.

If the driving force produced by all the electrical motors 10 on the two driving axle 51/52 is not sufficient to drive the electric vehicle 101, the present invention as shown in FIG. 4 may also use more than two axle driving system, with/without above electric motor 10 transmission system 90 method to have additional axle 53, additional electrical motors 10 and additional batteries 311 that can produce sufficient higher driven force/torque to drive the vehicle such as truck, train, or other transportation vehicles. (see FIG. 4). FIG. 13 illustrates a type of truck application, or alternatively, the present invention may just add more batteries 311 to increase the current in the electrical motor 10 to produce higher driving torque force before the electrical motor 10 reaches to its saturation situation (see FIG. 19A).

Unlike the traditional hybrid vehicle that has an engine inside, such electrical vehicle 101 may include a back up fuel generator/alternator 41 which may be external to the electrical vehicle 101 as a kind of hybrid type vehicle to generate electricity for the electrical motors 10 when the batteries 311 are out of electrical power in order to extend the driving distance. (see FIG. 1, FIG. 2, FIG. 3A, FIG. 3B, FIG. 4)

Of course, the present invention may also just use a external fuel generator/alternator 41 that can produce electrical power to connect the electrical motor 10 as the only power source to drive this electrical vehicle 101. Such electrical vehicle becomes a fuel driven type vehicle but still not like normal/traditional engine driven vehicle because there is no engine and transmission box inside. Such electrical vehicle may have higher energy efficiency comparing with normal engine driven vehicle.

In order to achieve higher driven torque/force, the present invention may either use additional electrical motors 10 and batteries 311 and/or additional driving axle 50 as mentioned above. The present invention may just use more batteries 311, and the present invention may allow all of the motors 10 to have higher voltage (such as serial connection of two and/or more batteries 311) in order to produce higher current and additional Ampere-turns in the electric motor 10 that can generate more motor turning driving torque/force that need to drive the electrical vehicle 101 as long as the electric motor 10 hasn't reached its saturation point. (see FIG. 19 A)

FIG. 19B illustrates another way of changing the current of electrical motor 10 by changing the resistance in order to change the torque of motor. The present invention may be able to use only one electrical motor 10 to drive the vehicle if the electric vehicle 101 has enough energy battery, or other power source supply.

The electrical motor 10 as shown in FIG. 1, FIG. 2, FIG. 3A, FIG. 3B, and FIG. 4 may be a Disk Type Motor (or called Flux Motor, Pancake motor) (see FIG. 5A, FIG. 5B, FIG. 5C, FIG. 5D, FIG. 8A, FIG. 8B and FIG. 9), or the electric motor 10 may be a non-disk type motor, especially those brushless motor such as capacitor brushless type motor (see FIG. 14A, FIG. 14B, FIG. 14C and FIG. 15A, FIG. 15B, FIG. 15C), or the electric motor 10 may be a mix of all kind of electrical motors (see FIG. 16A, FIG. 16B, FIG. 16C) as long as they can produce enough force to meet the driving requirements.

Figure 5:
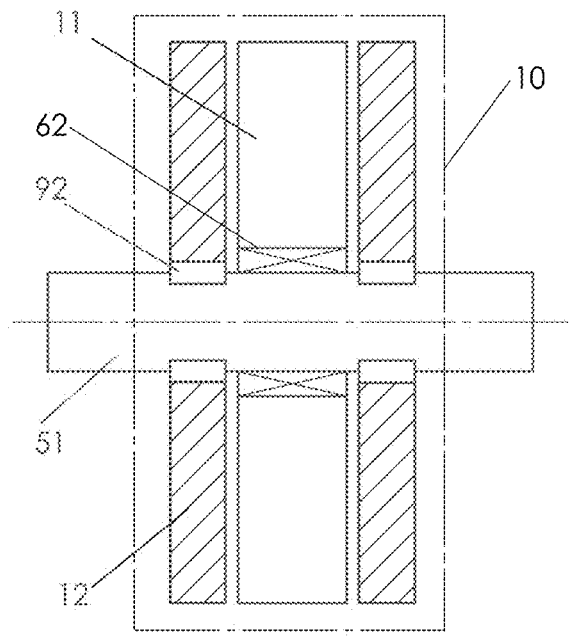
FIG. 5A illustrates a cross-sectional view of the electric motor of the present invention.
FIG. 5B illustrates a perspective view of the electric motor of the present invention.
FIG. 5C illustrates a side view of the electric motor of the present invention.
FIG. 5D illustrates a side view of the electric motor of the present invention.
Figure 5:
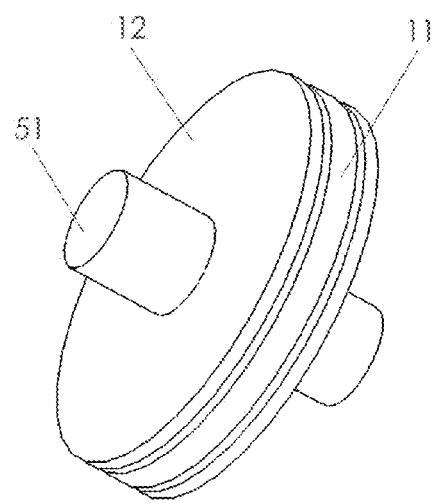
Figure 5:
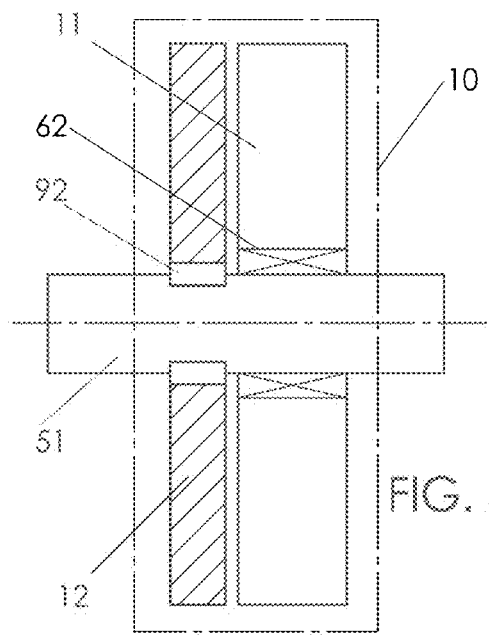
Figure 5:
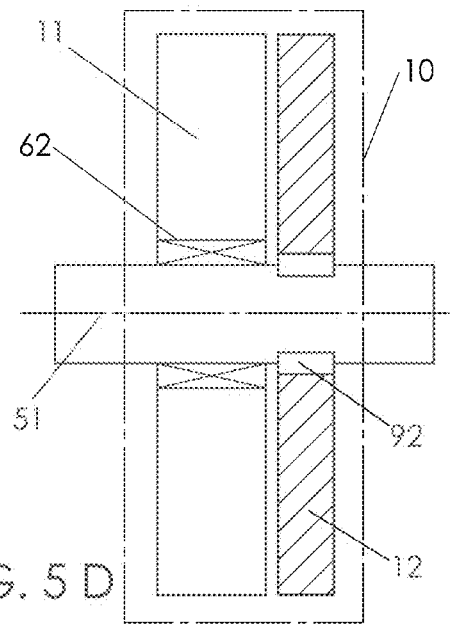

FIG. 5A shows two sides of rotor 12 disk type motor. FIG. 5A shows a motor 10 mounted on a driving axle 51 and illustrates a stator 11 which may be sandwiched between a pair of opposing rotors 12. FIG. 5 C and FIG. 5D show one side of rotor or stator of disk type motor.

Figure 8:
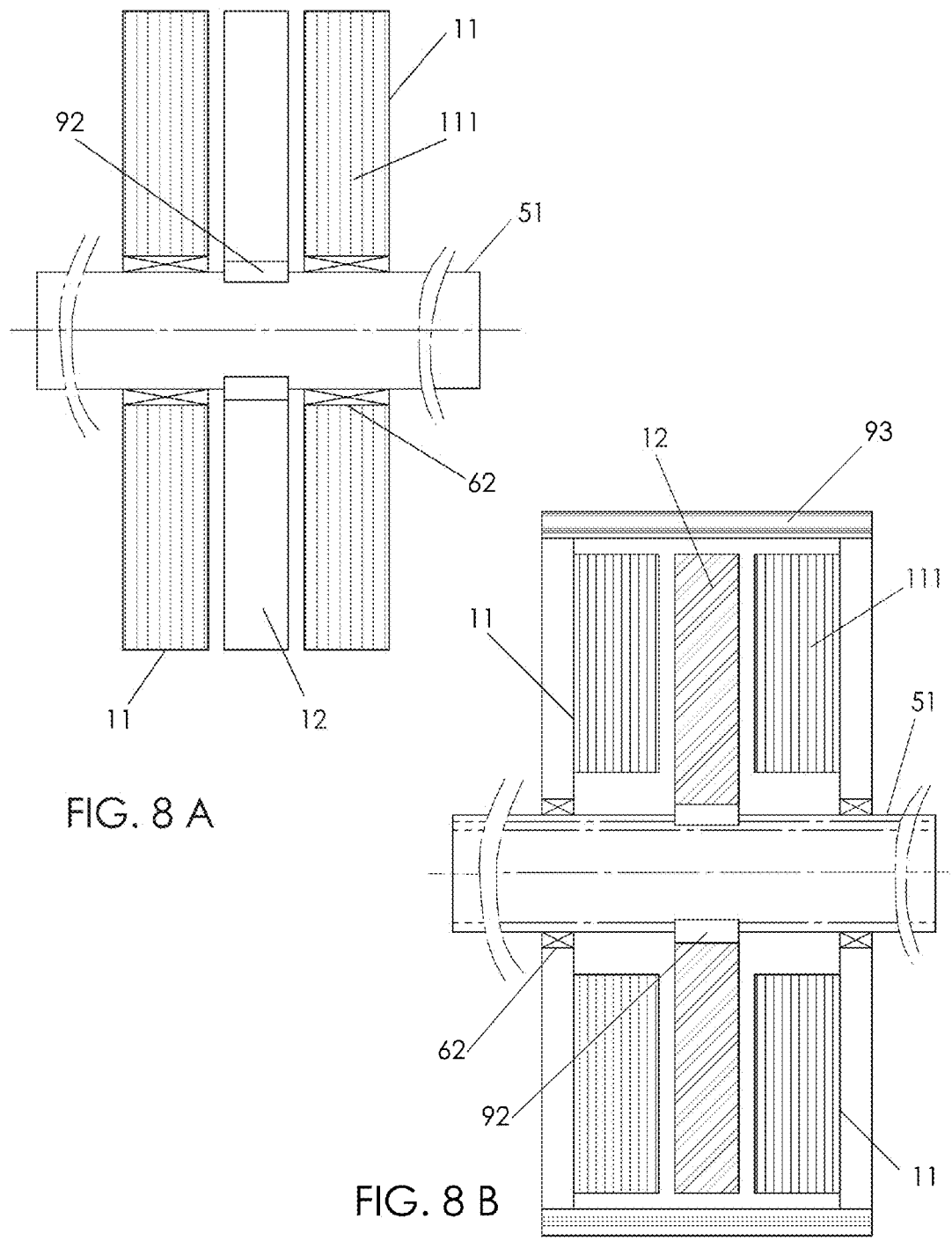
FIG. 8A illustrates a cross-sectional view of another schematic drawing of the electric motor of the present invention.
FIG. 8B illustrates a cross-sectional view of another schematic drawing with a motor sealing cover of the electrical motor of the present invention.

FIG. 8A shows two sides of stator disk type motor, and illustrates a rotor 12 which may be sandwiched between a pair of stators 11.

The electrical motor may include a seal cover 93 (FIG. 8B shows one way of sealing, seal each electrical motor separately, or seal all the electrical motors on the same axle together) to protect the electrical motor 10 to prevent the dust, dirty, water or others that goes into the electrical motor 10 and damage the electrical motor 10. The seal cover 93 may be positioned over the stator 11 and covers the coil 111. FIG. 8A, FIG. 8B additionally illustrates the bearing 62 and the key 92.

The coil 111, 112, 113, 114 wire of the electrical motor 10 may be a magnet wire such as round, square or rectangle shape wire, or can be a super conductive wire (or called ultra conductive wire) to make this electrical vehicle 101 have better efficiency with respect to electrical power and higher electric efficiency.

Depending on the driving force requirements, the present invention may also use mechanical, hydraulic, pneumatic, electrical or/and combined all devices to move the rotor away or close to stator along the shaft in order to provide versatility for the disk type electric motor 10.

The electrical motor 10 driving invention may be used on all kind of transportation vehicles such as train, boat, ship, yacht, marine equipment, submarine, airplane, car, bus, truck, snowmobiles, ATV, RV, tractor, motorcycle, scooter as well as those off-highway construction mobile machinery, bicycle, bike, mowing machine, etc.

FIG. 17A, FIG. 17B, FIG. 17C, FIG. 17D shows a motorcycle application with one and/or two driven axles (when driven axle 51, 52 becomes short and electrical motor 10 quantity become less from FIG. 1).

Figure 17:
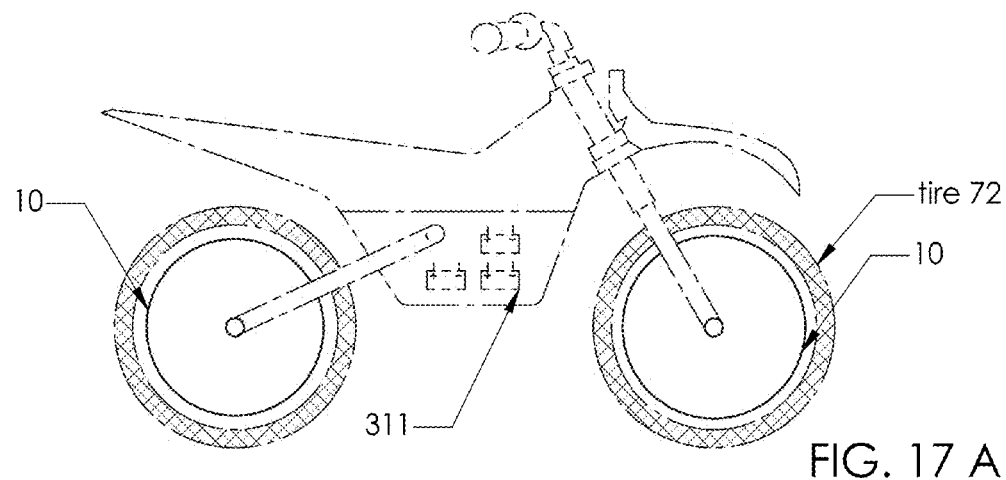
FIG. 17A illustrates a perspective view of another vehicle having the electrical motor of the present invention.
FIG. 17B illustrates a cross-sectional of the electrical motor and frame of the vehicle of the present invention.
FIG. 17C illustrates a cross-sectional view of the electrical motor and frame of the vehicle of the present invention.
FIG. 17D illustrates a cross-sectional view of the electrical motor and frame of the vehicle of the present invention.
Figure 17:
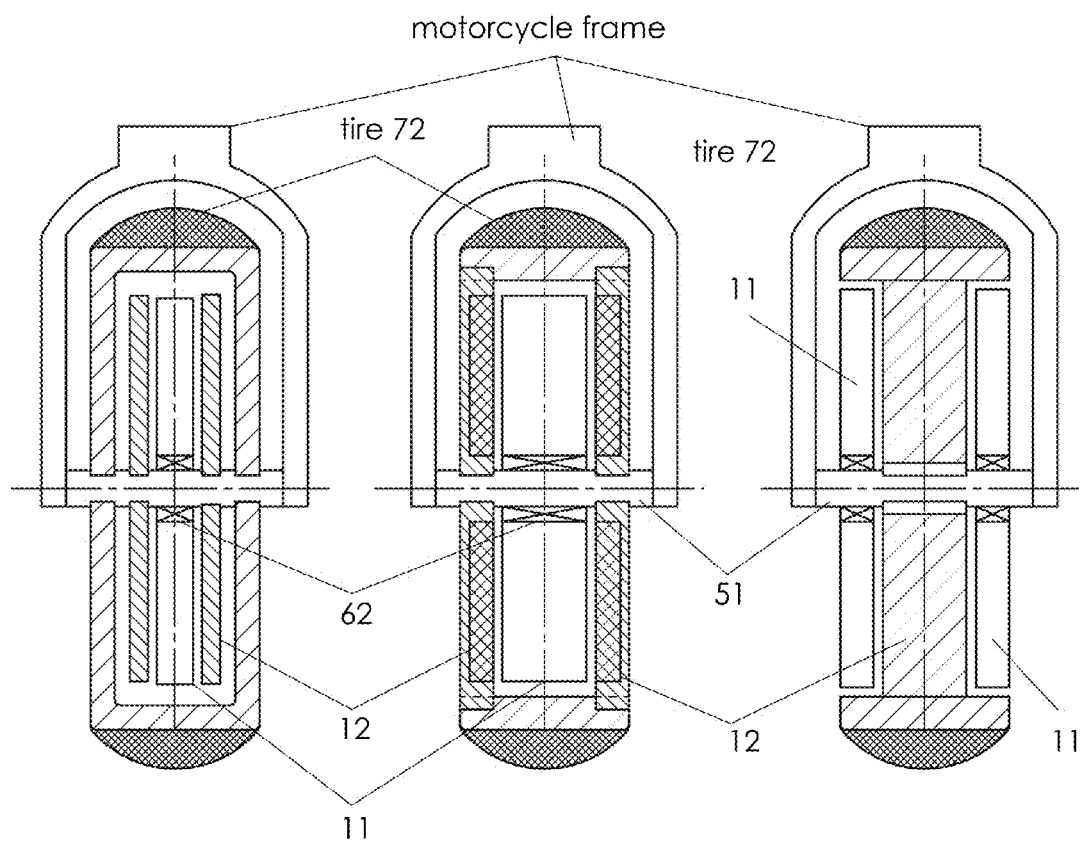

More particularly, FIG. 17A illustrates a side view of the motorcycle.

FIG. 17B illustrates the motorcycle frame, the wheel frame, the stator 11, the rotor 12, the bearing 62 and the driving axle 51.

FIG. 17C illustrates the motorcycle frame, the wheel frame, the stator 11, the rotor 12, the bearing 62 and the driving axle 51.

FIG. 17D illustrates another schematic of the motorcycle frame, the wheel frame, the stator 11, the rotor 12, the bearing 62 and the driving axle 51.

Figure 18:
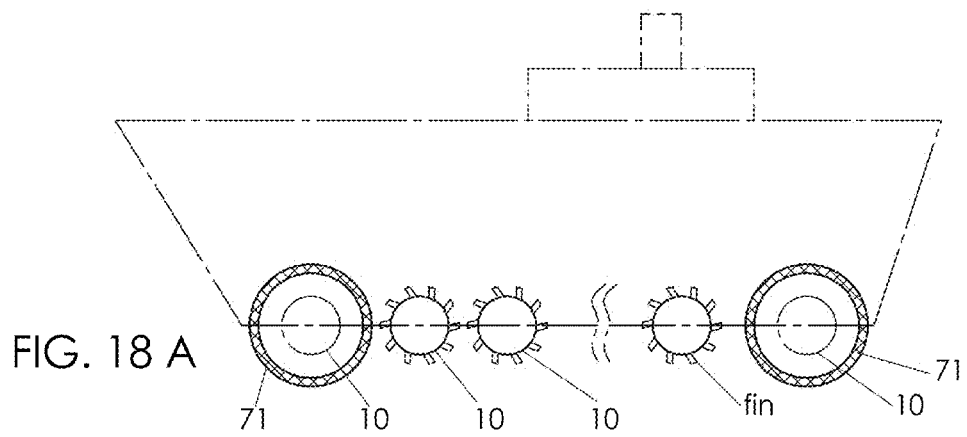
FIG. 18A illustrates a side view of another vehicle of the present invention.
FIG. 18B illustrates a bottom view of the vehicle of the present invention.
Figure 18:
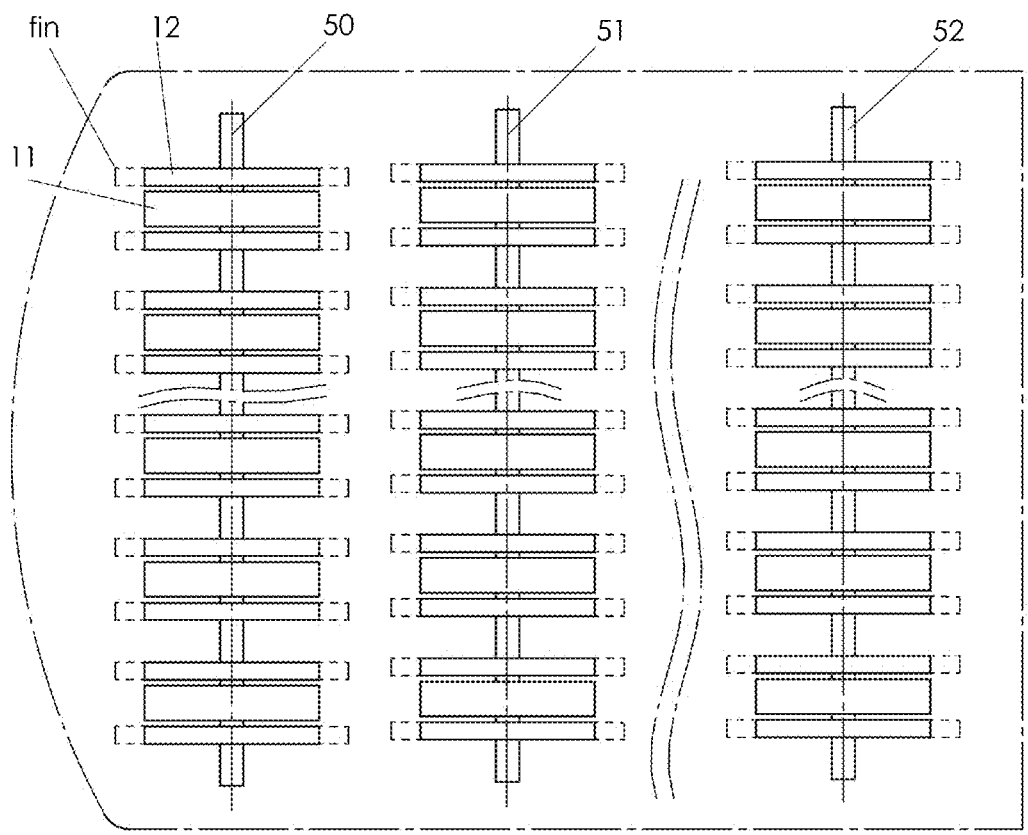

FIG. 18B shows the bottom of boat application when there are more than one driving axles 50. The ship will be similar to the boat driving system. A fin may be mounted on the rotor 12 to form a force on the water to drive the boat, and at the boat application may include a wheel 71 to become amphibious application.

Additionally, FIG. 18A shows the present invention may be used on the ground as well as and/or in the water in order to provide a dual application vehicle on the ground and in the water.

The electrical motor 10 may be used as a driving force in the vehicle and may also be used as a braking force when braking or slow down the vehicle, and may convert the mechanical moving energy into electrical energy and charge the battery 311 in order to reduce the energy loss when braking or slowing down.

The electric vehicle 101 of the present invention may not include a ABS system in a vehicle because the electric vehicle 101 may simply use the reversing electrical motor force as the braking force by high frequency on/off as ABS type to replace the mechanical braking force and slow down the vehicle 101.

The electrical vehicle 101 of the present invention may include a remote control to drive the vehicle 101 rather than human being inside to drive the vehicle.

Based on driving requirement applications, the electric vehicle 101 of the present invention may not include the universal axle (or called differential system, or universal joints) 61, or the electric vehicle 101 may use a multiple of such differential universal axle system 61 when needed in such electrical vehicle.

Figure 12:
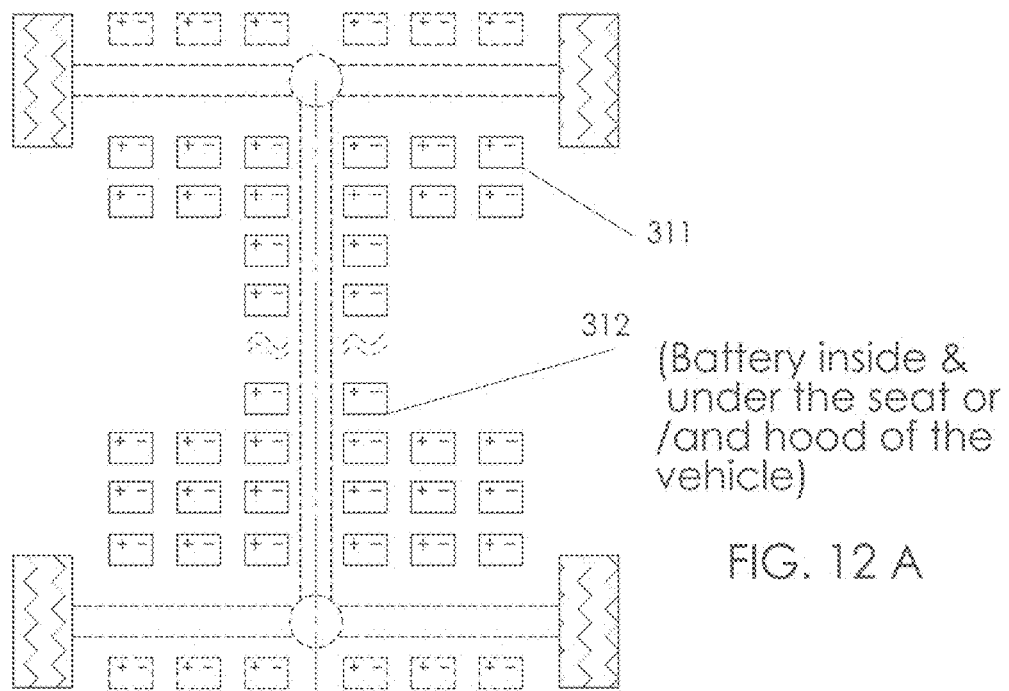
FIG. 12A illustrates an array of batteries inside the electric vehicle of the present invention.
FIG. 12B illustrates an array of batteries outside the electric vehicle of the present invention.
Figure 12:
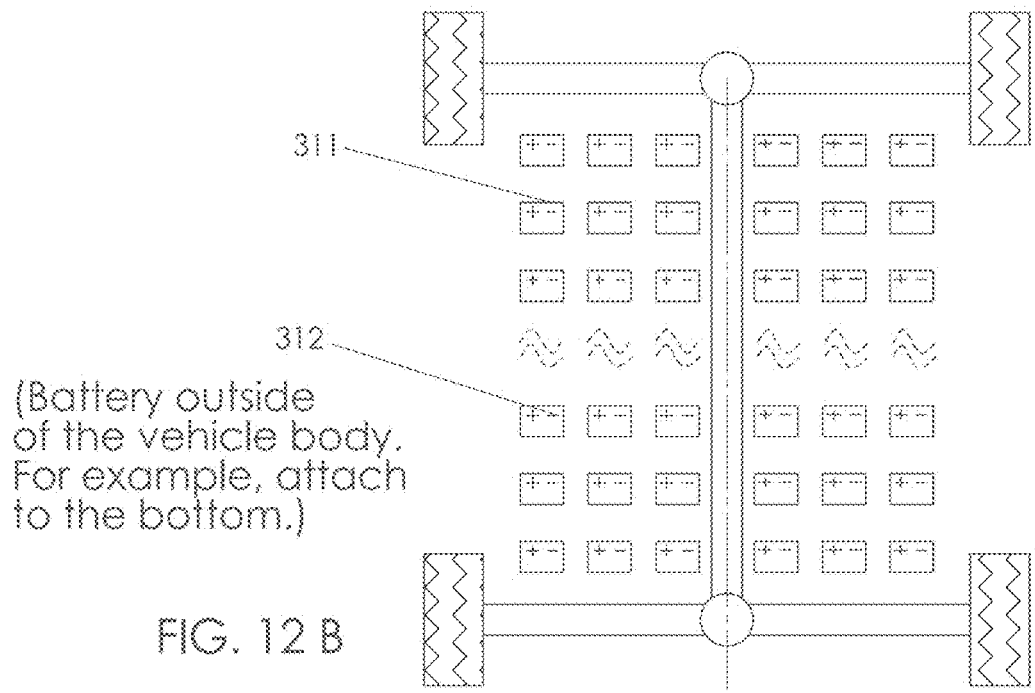

FIG. 12A shows one embodiment with batteries 311, 312 positioned inside the vehicle 101 for example under the seat of the vehicle, and/or under the hood.

FIG. 12B illustrates another embodiment with batteries 311, 312 positioned exterior the vehicle 101 for example on the bottom of the vehicle 101.

FIG. 14A illustrates a cross-sectional view of the stator 11 and rotor 12 of another schematic the electrical motor 10 of the present invention.

FIG. 14B illustrates a side view of the stator 11, rotor 12, driving axle 51 and key 92 of the electrical motor 10 of the present invention.

FIG. 14C illustrates a perspective view of the stator 11 and rotor 12 which may be positioned on the driving axle 51 of the electrical motor 10 of the present invention.

FIG. 15A illustrates a cross-sectional view of the stator 11 and rotor 12 of another schematic drawing of the electrical motor 10 of the present invention.

FIG. 15B illustrates a side view of the stator 11, rotor 12, driving axle 51 and key 92 of the electrical motor 10 of the present invention.

FIG. 15C illustrates a perspective view of the stator 11 and rotor 12 which may be positioned on the driving axle 51 of the electrical motor 10 of the present invention.

Figure 16:
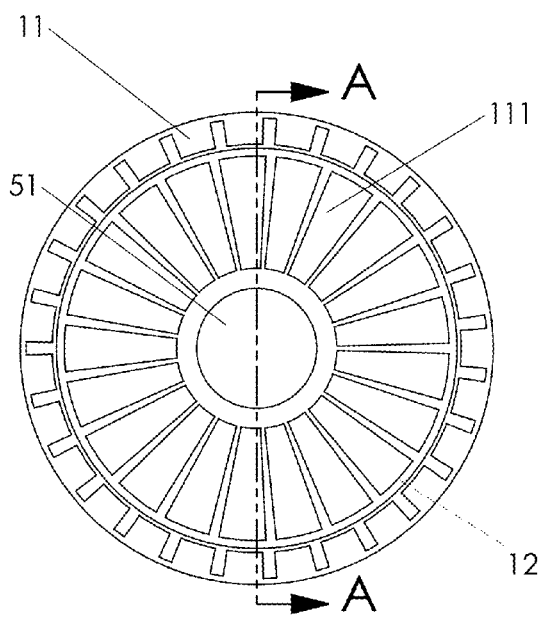
FIG. 16A illustrates a cross-sectional view of the stator and coil of the electrical motor of the present invention.
FIG. 16B illustrates a side cross-sectional view of the stator and rotor of the electrical motor of the present invention.
FIG. 16C illustrates a perspective view of the stator and coil of the electrical motor of the present invention.
Figure 16:
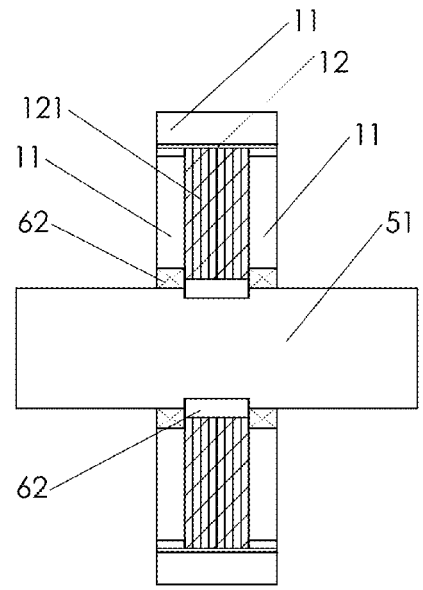
Figure 16:
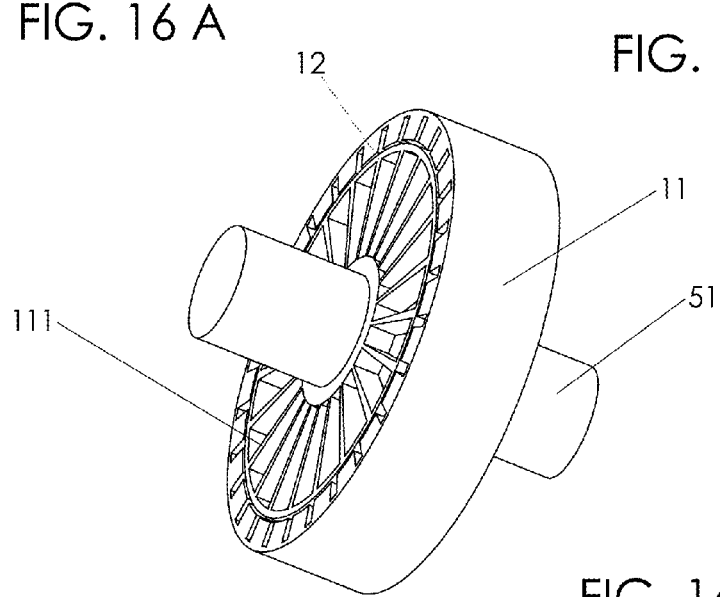

FIG. 16A illustrates a cross-sectional view of the stator 11 and coil 111 of another schematic drawing of the electrical motor 10 of the present invention.

FIG. 16B illustrates a side view of the stator 11, a rotor sheet 121, a bearing 62 for the driving axle 51 of the present invention.

FIG. 16C illustrates a perspective view of the stator 11 and the coil 111.

Figure 6:
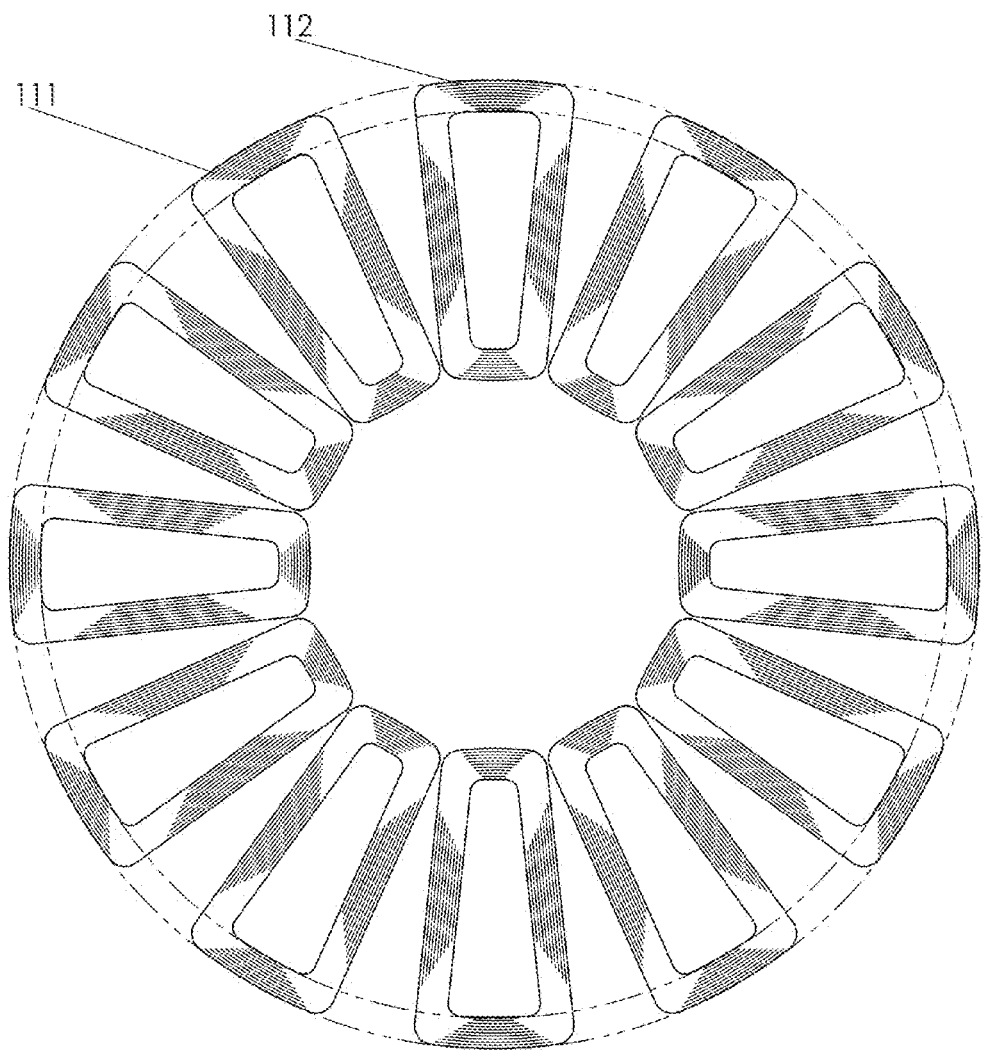
FIG. 6 illustrates the coils and the coil array for the electric motor of the present invention.
Figure 7:
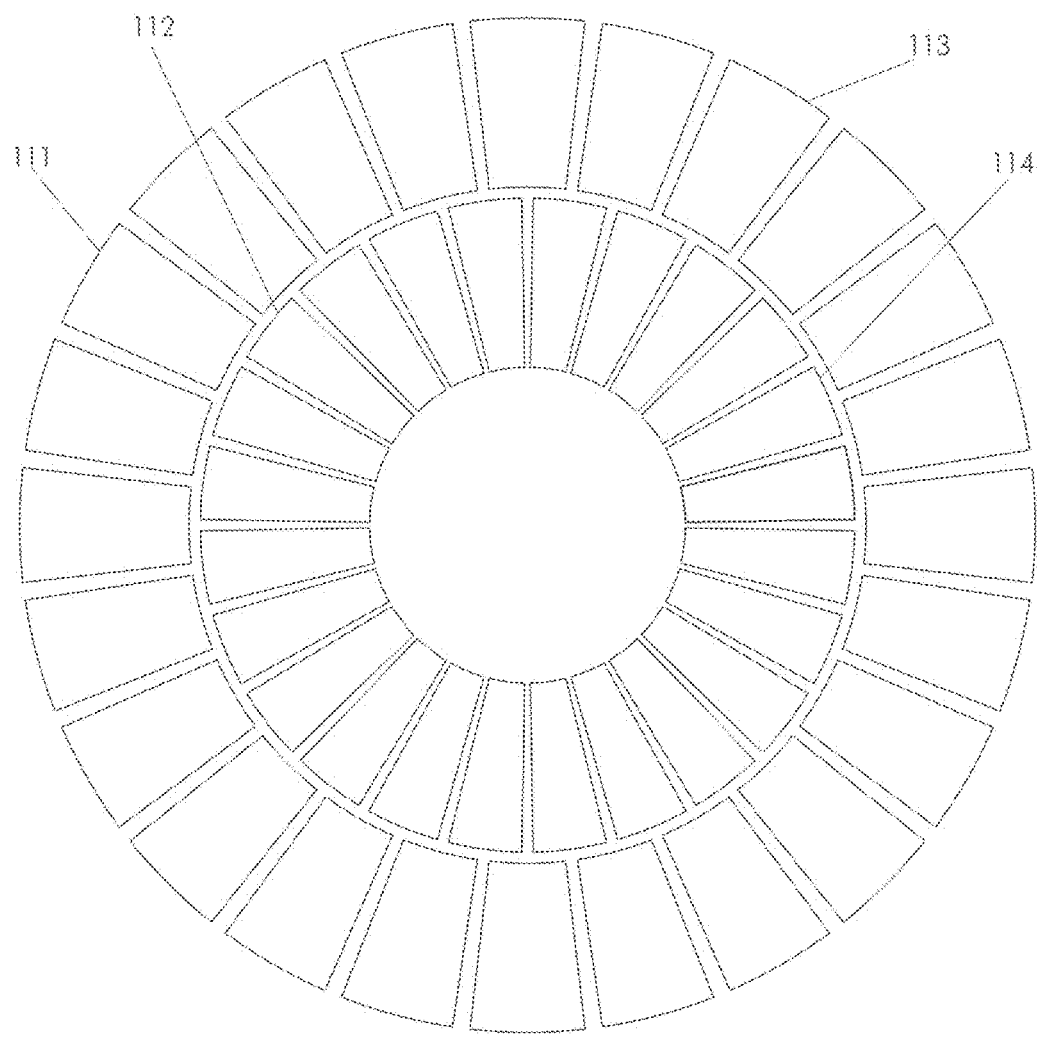
FIG. 7 illustrates inner and outer rings of coils for another schematic drawing of the electric motor of the present invention.

FIG. 6, FIG. 7, FIG. 10A and FIG. 11A show a few type of coils 111, 112, etc. that used on a Disk type motor. FIG. 10 A and FIG. 10 B show coils bended into one side, FIG. 11 A and FIG. 11 B show coils bent into two opposing sides (the middle one keeps straight without bending.) FIG. 6 illustrates a top view of a coil 111 which may be adjacent to a coil 112 which may form a ring of alternating coil 111 and coil 112. The coils 111, 112 may be formed from magnetic wire of the electric motor 10. FIG. 7 illustrates an outer ring of coils 111, 113 and a inner ring of coils 112, 114.

Figure 9:
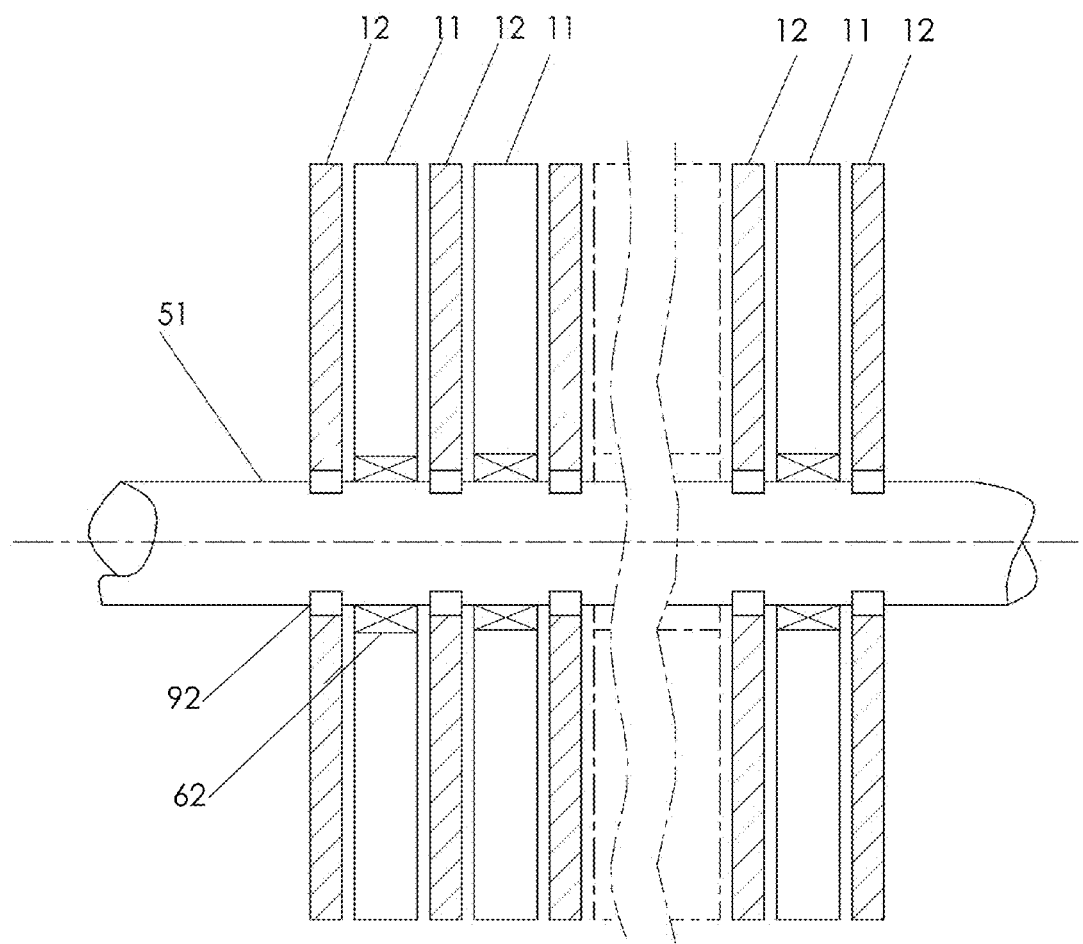
FIG. 9 illustrates a cross-sectional view of another schematic drawing of the electric motor of the present invention.
Figure 10:
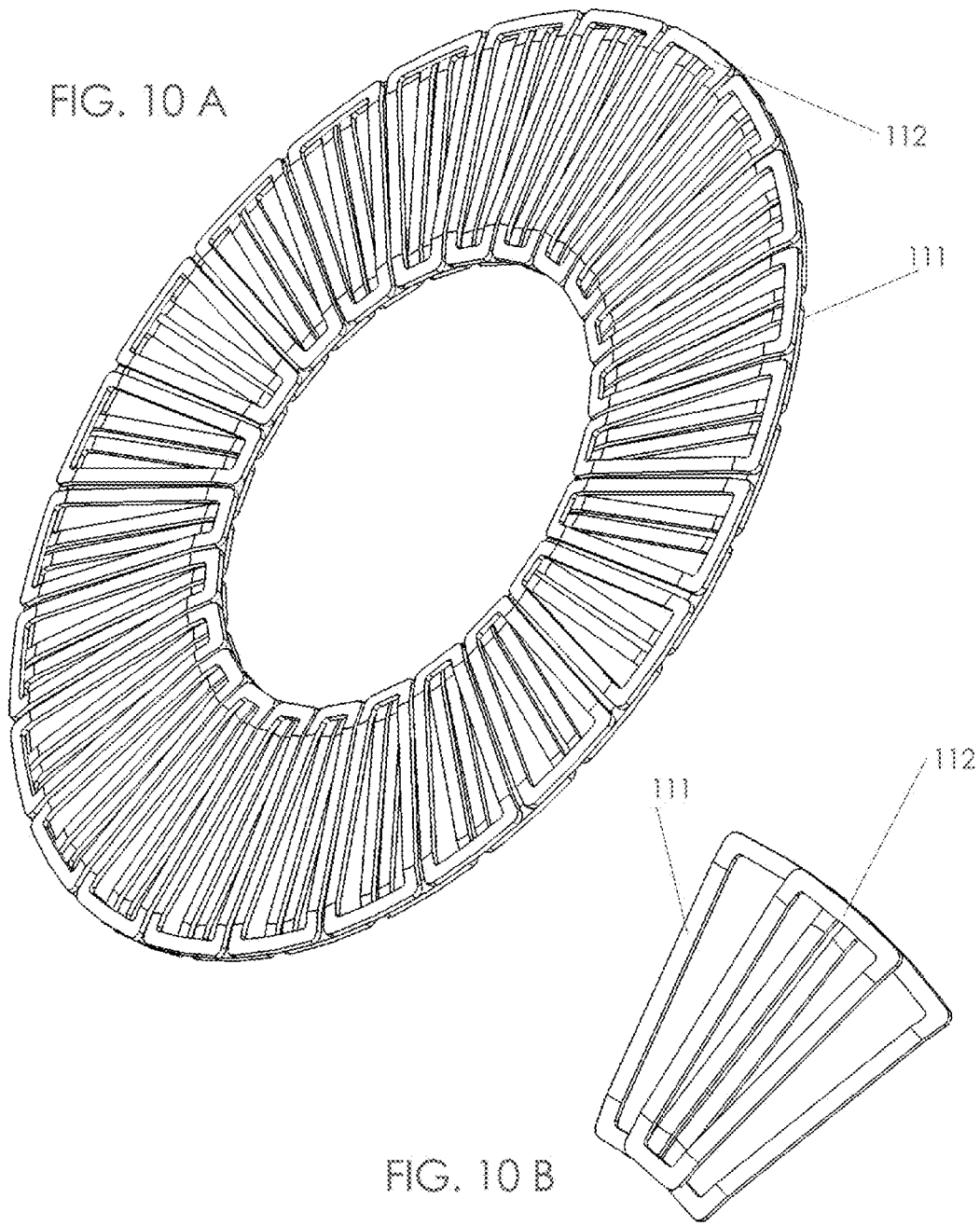
FIG. 10A illustrates a perspective view of the coil of the electric motor of the present invention.
FIG. 10B illustrates a sectional view of the coil of the electric motor of the present invention.
Figure 11:
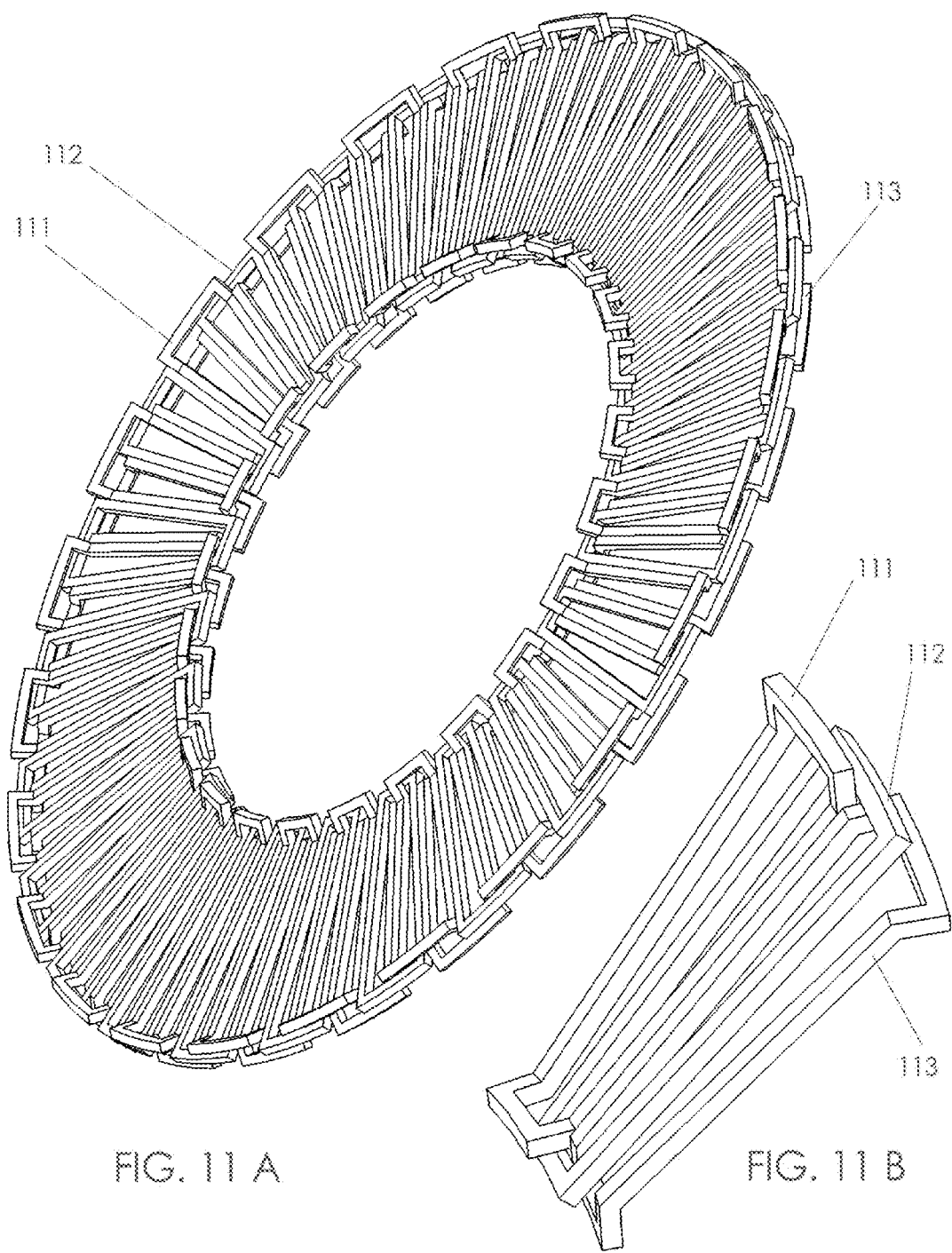
FIG. 11A illustrates a perspective view of the coil of the electric motor of the present invention.
FIG. 11B illustrates a sectional view of the coil of the electric motor of the present invention.

The electric disk motor 10 can be just one layer as shown in FIG. 5C and FIG. 5D, two-layer as shown in FIG. 5A, FIG. 5B, FIG. 8A and FIG. 8B, or three or more layers type as shown in FIG. 9. The stator 11 of such disk type motor may be positioned in the middle of the motor as shown in FIG. 5A, or the stator 11 may be positioned at the sides (two coils) as shown in FIG. 8A and FIG. 8B, or the stator 11 combined with a few coils and few layer type electrical motor 10 as shown in FIG. 9 that may be used especially for start-up, or/and back-up electrical motor 10, which may produce higher torque/force as compared with a single layer type electrical motor on the driven axle 50 that needs to add or deduct smaller amount of driven force when connected with electrical power. Such multi-layer electrical motor arrangement as FIG. 9 may save space on the driving axle.

The smart electrical vehicle 101 may have much higher moving speed (which depending on electrical motor 10 turning speed, and the driving resistance of the vehicle) and may easily control the vehicle maximum moving speed by the motor quantities and the frequency of electrical motor poles that connecting with electrical power. For instance, the police and racing vehicles may have much higher maximum moving speed comparing with a vehicle 101 of a normal user. Also, when driving in reverse, the present invention may reduce the number of connected electrical motors 10 with electrical power and control the frequency of electrical motor turning speed in order to control the maximum reverse driving vehicle moving speed.

The smart electrical vehicle 101 may be much safer compared with the traditional engine fuel driven vehicle with respect to explosion because of the lack of explosive fuel or a reduced amount of fuel inside for the hybrid type. Even the hybrid or pure fuel type of such electrical vehicle 101 may just need to use a small amount of fuel.

Also, the mass center of the smart electrical vehicle 101 may be lower than tradition engine driven vehicle because some or all the batteries 311 may be mounted at the bottom of the vehicle (which is also easy to change the battery 311 when needed). In the alternative, the battery may also be placed inside vehicle such as under the seat, under the hood, or other places of vehicle (see FIG. 12A and FIG. 12B)

When driving this smart electrical vehicle 101 based on the driving requirements such as driving speed, weights, loads, driving resistance, etc, the controller 21 may calculate and operate the optimal needed number of electrical motors 10 that need to connect with electrical power, and the frequency the motor coil pole 111 conducting with the electrical power from the electrical power supply for example such as batteries 311 in order to provide for a smooth ride.

When the smart electrical vehicle 101 makes turns, the controller 21 also can calculate and operate the optimal number of electrical motors 10 that needed to connect the electrical power, and determine in which side of the driven axle 50 based on the angle of turn and other factors in order to obtain no or little sliding of turning.

In order to have longer and smart use of battery 311 in this electrical vehicle 101, the controller 21 periodically may detect the electrical power level in each battery 311, and connects the highest electrical power level battery 311 first, the second highest electrical power battery 311 second, etc. when driving this vehicle 101. When slowing down or braking the vehicle 101, the controller 21 connects the lowest electrical power level battery 311 first, the second lowest electrical power battery second, etc. to charge the least electrical power battery 311 first, the second least electrical power battery 311 second, etc.

If there is a vertical vibration in the vehicle while the vehicle is moving, the present invention may mount a magnetic field on the body of the vehicle and mount the coil on the vibration part such as on the wheel system, or mount the magnetic field on the vibration part such as on the wheel system and mount the coil on the body of the vehicle, which may allow the coil to cut the flux lines of the magnetic field and in return to generate electricity. (see FIG. 20A, FIG. 20B, FIG. 20C, FIG. 20D). In this way, the mechanical vibration energy may be converted into electrical energy and charge back to the battery 331.

Of course, the electrical vehicle 101 may include voice recognition, finger or palm recognition, face recognition, eye recognition, password or pin number recognition, or other thief-stop device to protect the electric vehicle 101 from being stolen.

10 - - - electrical motor; 11 - - - stator of an electrical motor; 12 - - - rotor of an electrical motor; 21 - - - controller (to control the motor on/off and the frequency of coil energized); 31 - - - battery unit; 41 - - - generator or alternator; 50, 51, 52, 53, 54 - - - driving axle; 61 - - - universal joint, u-joint; cv-joints, differential system; 62 - - - bearing; 71 - - - wheels; 81 - - - universal axle; 90 - - - transmission system; 91 - - - gear; 92 - - - key; 93 - - - electrical motor cover; 103 - - - electrical drive system; 111, 112, 113, 114 - - - coil of electrical motor; 121 - - - rotor sheet; 311, 312, 313 - - - battery;

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. An electric vehicle, comprising:
   a first drive axle to drive a first wheel of the electric vehicle;
   a first electric motor mounted directly on the first drive axle;
   a battery unit that powers the first electric motor;
   a controller to control the electric motor,
   wherein the controller controls the electric motor based upon driving speed, driving resistance, wind resistance, weight and the load, wherein the controller controls the electric motor to have the same turning speed in order to meet the driving requirements;

and wherein the electrical motor includes a dirty cover.

2. An electric vehicle as in claim 1, wherein the electric vehicle includes a second drive axle to drive a second wheel and a second electric motor that is mounted on the second drive axle.

3. An electric vehicle as in claim 1, wherein the electric vehicle includes multiple driving axles to drive the vehicle and electrical motors mounted on those additional driving axles.

4. An electric vehicle as in claim 1, wherein the electrical motor includes a driving axle to raise the height of the electrical motor.

5. An electric vehicle as in claim 1, wherein the electrical motor turning direction is similar to the wheel turning direction, is perpendicular to the bottom body of the vehicle or road surface.

6. An electric vehicle as in claim 1, wherein the vehicle is a hybrid electrical vehicle combined with a fuel type generator/alternator and battery to provide electricity for the electrical motor.

7. An electric vehicle as in claim 1, wherein the vehicle is front drive; wherein the vehicle is rear/back drive; and wherein the vehicle is four-wheel-drive.

8. An electric vehicle as in claim 1, wherein the electrical motor is a disk type electrical motor, and wherein the stator is positioned in the middle of the electrical motor and sandwiched by the rotors or positioned into sides of the electrical motor and sandwiches the rotor.

9. An electric vehicle as in claim 1, wherein the electrical motor is a non-disk type electrical motor.

10. An electric vehicle as in claim 1, wherein the motor is a combination of disk type electrical motor and non-disk type electrical motor.

11. An electric vehicle as in claim 1, wherein the electrical motor is a single layer type electrical motor; wherein the electrical motor is a two or multiple layer type electrical motor, and wherein the multiple layer type electrical motor includes multiple stators and multiple rotors provides higher torque for backup operation or startup operation.

12. An electric vehicle as in claim 1, wherein the controller controls additional electrical motors to meet driving requirements, and wherein the controller connects additional batteries to provide higher driving force.

13. An electric vehicle as in claim 1, wherein the controller may periodically detect electrical power level in each battery, and wherein the battery is charged by one utility power supply, solar, wind power charger mounted on the vehicle, sun heat from inside the vehicle or by wireless remote charging system.

14. An electric vehicle as in claim 1, wherein the vehicle is one of a car, a SUV, a pickup, a train, a boat, a ship, a yacht, a marine equipment, a submarine, an airplane, a helicopter, a bus, a truck, a snowmobile, an ATV, a RV, a tractor, a motorcycle, a scooter, a three wheel vehicle, a off-highway construction mobile machinery, a bicycle, a bike, a mowing machine; and wherein the vehicle is a police car including a racing engine to provide higher moving speed.

15. An electric vehicle as in claim 1, wherein the battery is formed from an array of batteries; wherein the battery is interior to the electric vehicle.

16. An electric vehicle as in claim 1, wherein the mechanical moving energy converted into electricity and charge back to the battery when slowing down the vehicle; wherein using reversing electrical motor force with high frequency on/off to replace the traditional mechanical ABS system in the vehicle.

17. An electric vehicle as in claim 1, wherein the controller converts vehicle vertical vibration into electricity by using an electrical coil mounted on the wheel system of the vehicle, to cut the flux lines of magnetic field that are mounted on the body of a vehicle.

* * * * *